US005799290A

United States Patent [19]
Dolan et al.

[11] Patent Number: 5,799,290
[45] Date of Patent: Aug. 25, 1998

[54] METHOD AND APPARATUS FOR SECURELY AUTHORIZING PERFORMANCE OF A FUNCTION IN A DISTRIBUTED SYSTEM SUCH AS A POSTAGE METER

[75] Inventors: Donald T. Dolan, Ridgefield; Dale A. French, Clinton; Kathryn V. Lawton, Branford, all of Conn.

[73] Assignee: Pitney Bowes Inc., Stamford, Conn.

[21] Appl. No.: 579,507

[22] Filed: Dec. 27, 1995

[51] Int. Cl.⁶ .................................................... G07B 17/00
[52] U.S. Cl. ........................................ 705/410; 340/825.34
[58] Field of Search ............................. 235/375, 380,
235/381, 382, 382.5; 340/825.3, 825.31,
825.34; 364/400, 464.11, 464.2; 280/23.25;
705/401, 410

[56] References Cited

U.S. PATENT DOCUMENTS

| | | | |
|---|---|---|---|
| 4,123,747 | 10/1978 | Lancto et al. | 235/380 X |
| 4,168,533 | 9/1979 | Schwartz | 364/464.13 |
| 4,193,131 | 3/1980 | Lennon et al. | 375/2 |
| 4,218,738 | 8/1980 | Matyas et al | 178/22 X |
| 4,238,853 | 12/1980 | Ehrsam et al. | 375/2 |
| 4,386,234 | 5/1983 | Ehrsam et al | 178/22.09 |
| 4,500,750 | 2/1985 | Elander et al. | 380/21 |
| 4,575,537 | 3/1986 | Edelmann et al. | 380/23 X |
| 4,649,233 | 3/1987 | Bass et al. | 380/21 |
| 4,720,859 | 1/1988 | Aaro et al. | 380/23 |
| 4,755,940 | 7/1988 | Brachtl et al. | 364/408 |
| 4,775,246 | 10/1988 | Edelmann et al. | 380/23 |
| 4,780,601 | 10/1988 | Vermesse | 235/375 |
| 4,786,790 | 11/1988 | Kruse et al. | 235/380 |
| 4,813,912 | 3/1989 | Chickneas et al. | 364/464.18 |
| 4,827,113 | 5/1989 | Rikuna et al. | 235/432 |
| 4,831,555 | 5/1989 | Sansone et al. | 364/464.18 X |
| 4,858,138 | 8/1989 | Talmadge | 364/464.02 |
| 4,922,521 | 5/1990 | Krikke et al. | 379/93.02 |
| 4,935,961 | 6/1990 | Gargiulo et al. | 380/21 |
| 4,935,962 | 6/1990 | Austin | 380/25 |
| 4,980,542 | 12/1990 | Jackson et al. | 235/375 |
| 5,048,085 | 9/1991 | Abraham et al. | 380/23 |
| 5,068,894 | 11/1991 | Hoppe | 380/23 |
| 5,142,577 | 8/1992 | Pastor | 380/21 |
| 5,148,481 | 9/1992 | Abraham et al. | 380/46 |
| 5,157,726 | 10/1992 | Merkle et al. | 380/23 |
| 5,200,903 | 4/1993 | Gilham | 364/464.18 |
| 5,224,163 | 6/1993 | Gasser et al. | 380/25 X |
| 5,225,664 | 7/1993 | Iijima | 235/380 |
| 5,237,611 | 8/1993 | Rasmussen | 380/21 |
| 5,237,614 | 8/1993 | Weiss | 380/23 |
| 5,274,368 | 12/1993 | Breeden et al. | 340/825.31 |
| 5,283,744 | 2/1994 | Abumehdi | 364/464.02 |
| 5,307,411 | 4/1994 | Anvret et al. | 380/25 |
| 5,345,506 | 9/1994 | Tsubakiyama et al. | 380/23 |
| 5,379,344 | 1/1995 | Larsson et al. | 380/23 |
| 5,454,038 | 9/1995 | Cordery et al. | 380/23 |
| 5,583,779 | 12/1996 | Naclerio et al. | 364/464.18 |
| 5,592,034 | 1/1997 | Felmus et al. | 307/130 |
| 5,606,613 | 2/1997 | Lee et al. | 380/25 X |
| 5,613,215 | 3/1997 | Grube et al. | 455/38.2 |

*Primary Examiner*—Edward R. Cosimano
*Attorney, Agent, or Firm*—Steven J. Shapiro; Melvin J. Scolnick

[57] ABSTRACT

A method for authorizing performance of a function in a distributed system having first and second subsystems in communication with each other includes the steps of separately generating a mutual session key within the first and second subsystems; utilizing the mutual session key generated in each of the first and second subsystems for authenticating the first subsystem; and authorizing performance of the function only upon completion of the authenticating of the first subsystem. An apparatus performs the inventive method.

2 Claims, 3 Drawing Sheets

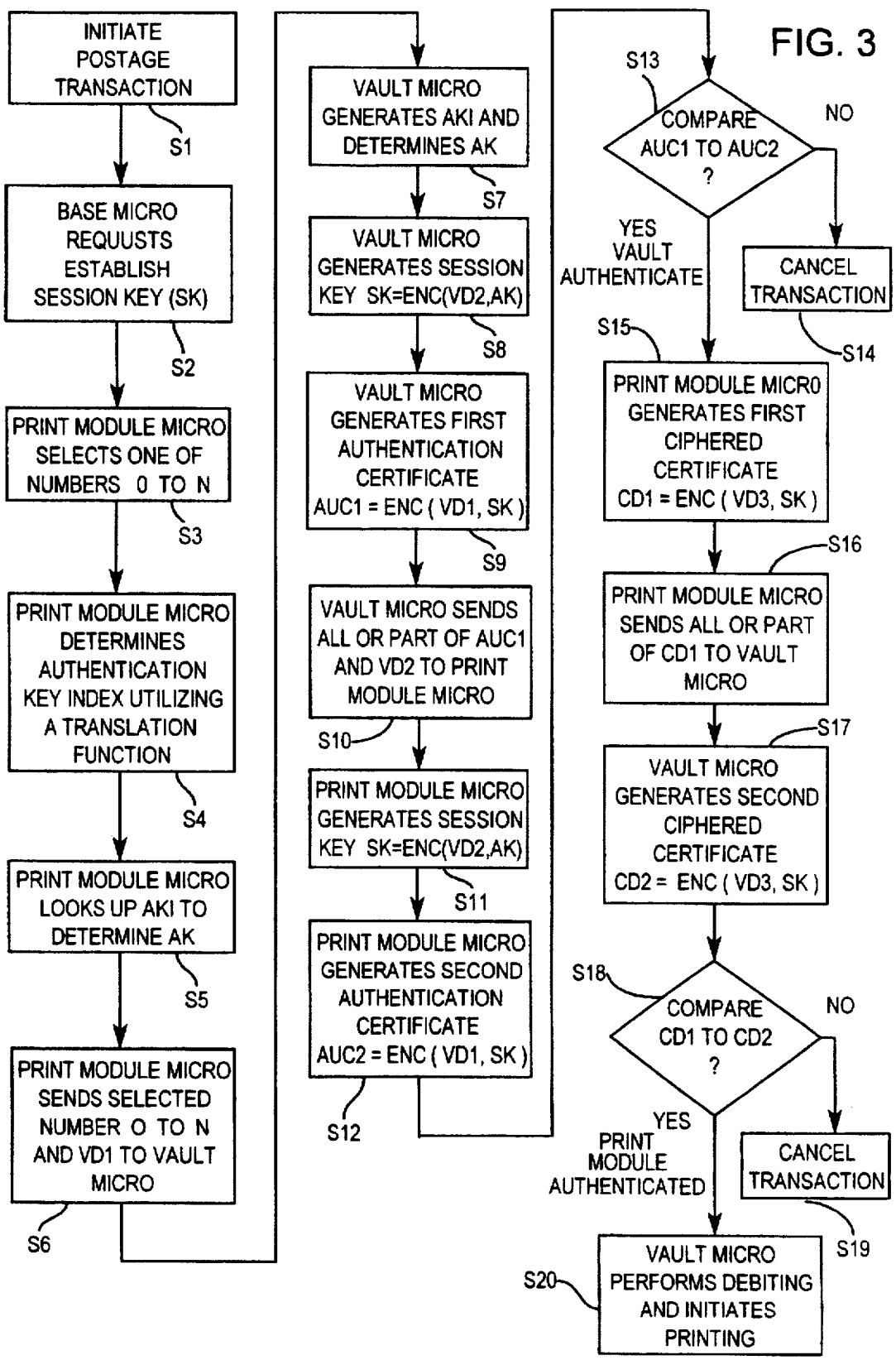

METHOD AND APPARATUS FOR SECURELY AUTHORIZING PERFORMANCE OF A FUNCTION IN A DISTRIBUTED SYSTEM SUCH AS A POSTAGE METER

BACKGROUND OF THE INVENTION

This invention relates to a method and apparatus for securely authorizing performance of a function in a distributed system, and more particularly to a method and apparatus for securely authorizing the printing of a postage indicia by a postage meter.

Traditional postage meters imprint an indicia on a mailpiece as evidence that postage has been paid. These traditional postage meters create the indicia using a platen or a rotary drum which are moved into contact with the mailpiece to imprint the indicia thereon. While traditional postage meters have performed admirably over time, they are limited by the fact that if the indicia image significantly changes, a new platen or rotary drum will have to be produced and placed in each meter. Accordingly, newer postage meters now take advantage of modern digital printing technology to overcome the deficiencies of traditional meters. The advantage of digital printing technology is that since the digital printhead is software driven, all that is required to change an indicia image is new software. Thus, the flexibility in changing indicia images or adding customized ad slogans is significantly increased.

Modern digital printing technology includes thermal ink jet (bubble jet), piezoelectric ink jet, thermal printing techniques, and LED and Laser Xerographic printing which all operate to produce images by dot-matrix printing. In dot-matrix ink jet printing individual print elements in the printhead (such as resistors or piezoelectric elements) are either electronically stimulated or not stimulated to expel or not expel, respectively, drops of ink from a reservoir onto a substrate. Thus, by controlling the timing of the energizing of each of the individual print elements in conjunction with the relative movement between the printhead and the mailpiece, a dot-matrix pattern is produced in the visual form of the desired indicia.

While digital printing technology provides the advantages discussed above, it also permits the size and weight of the meter to be dramatically reduced since the digital printhead is very small in size. Moreover, from an electronics architecture viewpoint the entire meter is now a distributed system having its various functions divided between numerous subsystems such as a vault subsystem and a printer subsystem. Each of the subsystems can communicate with each other but can also have independent processing capabilities permitting parallel processing of information and increased efficiency in operation. However, the downside of the above described distributed system is that when data is transferred over physically unsecured data lines, it is susceptible to interception and analysis utilizing, for example, a logic analyzer. If such interception and analysis occurs, the data signals may be capable of being reproduced. In the case of a postage meter, a vault typically accounts for the postage transaction prior to initiating printing of an indicia by the printer. Thus, if the vault print command signal can be reproduced, it may be possible to generate an indicia without having the associated accounting therefor taking place which would result in reduced revenues for the postal authority.

SUMMARY OF THE INVENTION

It is an object of the invention to provide a method and apparatus for securely authorizing the performance of a function by a distributed system.

A method for authorizing performance of a function in a distributed system having first and second subsystems in communication with each other includes the steps of:

A) separately generating a mutual session key within the first and second subsystems;

B) utilizing the mutual session key generated in each of the first and second subsystems for authenticating the first subsystem; and C) authorizing performance of the function only upon completion of the authenticating of step B).

An apparatus for performing the above-mentioned authorization includes:

a first subsystem having means for establishing a mutual session key; and a second subsystem having means for establishing the mutual session key separately from the first subsystem;

wherein the first and second subsystems communicate with each other and utilize the mutual session key established in each of the first and second subsystems to mutually authenticate each other and to only permit performance of the function upon completion of the mutual authentication.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a flow chart of the inventive mutual authentication method.

DETAILED DESCRIPTION OF THE PREFERRED EMBODIMENTS

Figure 1:
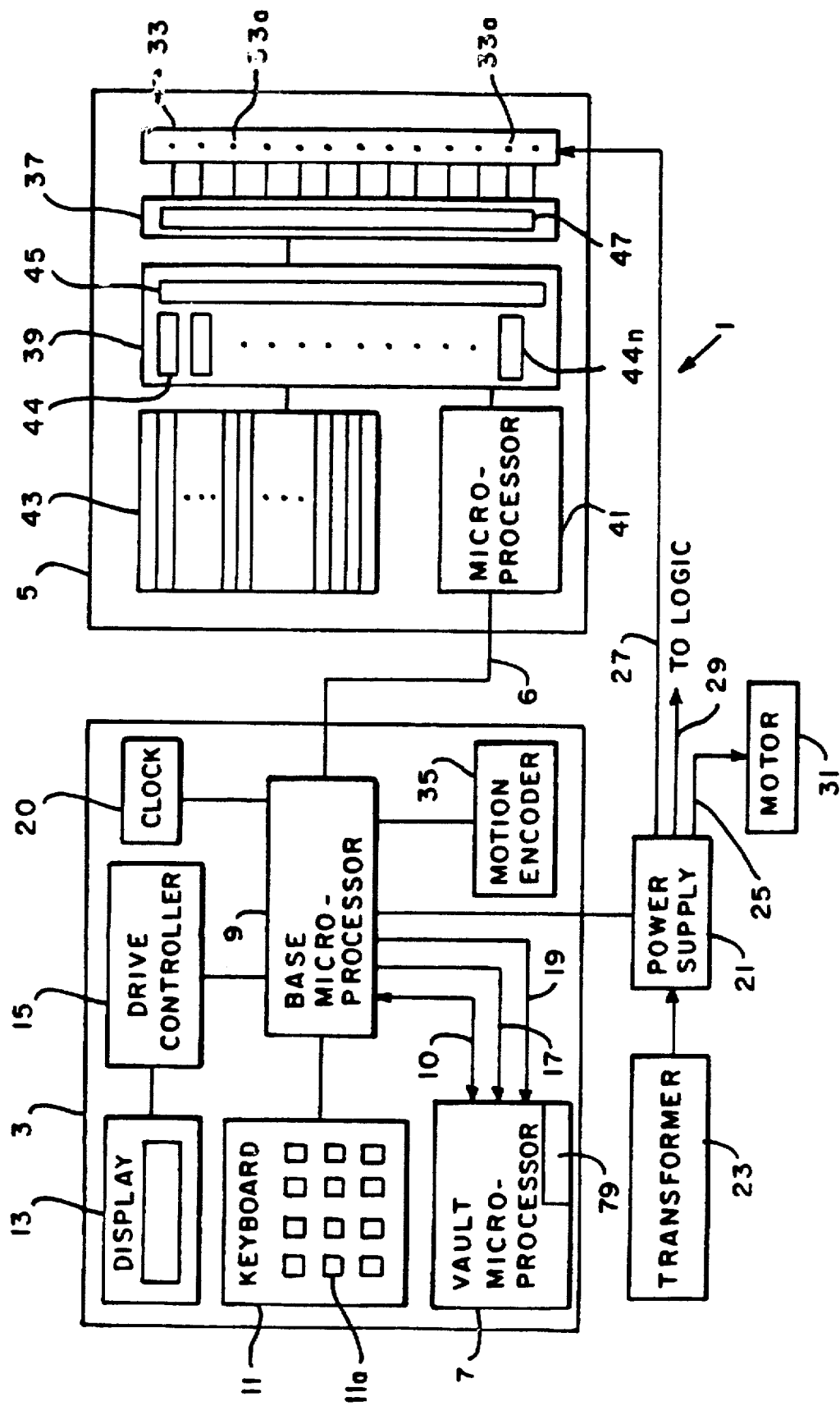
FIG. 1 is a schematic diagram of a postage meter incorporating the claimed invention.

FIG. 1 shows a schematic representation of a postage meter 1 implementing the inventive process. Postage meter 1 includes a base 3 and a printhead module 5. Base 3 includes a first functional subsystem referred to as a vault microprocessor 7 and a second functional subsystem referred to as a base microprocessor 9. Vault microprocessor 7 has software and associated memory to perform the accounting functions of postage meter 1. That is, vault microprocessor 7 has the capability to have downloaded therein in a conventional manner a predetermined amount of postage funds. During each postage transaction, vault microprocessor 7 checks to see if sufficient funds are available. If sufficient funds are available, vault microprocessor 7 debits the amount from a descending register, adds the amount to an ascending register, and sends the postage amount to the printhead module 5 via the base microprocessor 9. Base microprocessor 9 also sends the date of submission data to the printhead module 5, via line 6, so that a complete indicia image can be printed.

Vault microprocessor 7 thus manages the postage funds with the ascending register representing the lifetime amount of postage funds spent, the descending register representing the amount of funds currently available, and a control sum register showing the running total amount of funds which have been credited to the vault microprocessor 7. Additional features of vault microprocessor 7 which can be included are a piece counter register, encryption algorithms for generating vendor and postal tokens, and software for requiring a user to input a personal identification number which must be verified by the vault microprocessor 7 prior to its authorizing any vault transaction. Alternatively, the verification of the personal identification number could be accomplished by either the base microprocessor 9 or the print module microprocessor 41 (discussed below).

Base microprocessor 9 acts as a traffic cop in coordinating and assisting in the transfer of information along data line 10 between the vault microprocessor 7 and the printhead module 5, as well as coordinating various support functions necessary to complete the metering function. Base microprocessor 9 interacts with keyboard 11 to transfer user information input through keyboard keys 11a (such as, postage amount, date of submission) to the vault microprocessor 7. Additionally, base microprocessor 9 sends data to a liquid crystal display 13 via a driver/controller 15 for the purpose of displaying user inputs or for prompting the user for additional inputs. Moreover, base microprocessor 9 provides power and a reset signal to vault microprocessor 7 via respective lines 17, 19. A clock 20 provides date and time information to base microprocessor 9. Alternatively, clock 20 can be eliminated and the clock function can be accomplished by the base microprocessor 9. Base microprocessor 9 also provides a clock signal to vault microprocessor 7.

Postage meter 1 also includes a conventional power supply 21 which conditions raw A.C. voltages from a wall mounted transformer 23 to provide the required regulated and unregulated D.C. voltages for the postage meter 1. Voltages are output via lines 25, 27, and 29 to a printhead motor 31, printhead 33 and all logic circuits. Motor 31 is used to control the movement of the printhead 33 relative to the mailpiece upon which an indicia image is to be printed. Base microprocessor 9 controls the supply of power to motor 31 to ensure the proper starting and stopping of printhead 33 movement after vault microprocessor 7 authorizes a postage transaction.

Base 3 also includes a motion encoder 35 that senses the movement of the printhead motor 31 so that the exact position of printhead 33 can be determined. Signals from motion encoder 35 are sent to printhead module 5 to coordinate the energizing of individual printhead elements 33a in printhead 33 with the positioning of printhead 33. Alternatively, motion encoder 35 can be eliminated and the pulses applied to stepper motor 31 can be counted to determine the location of printhead 33 and to coordinate energizing of printhead elements 33a. While only one motor 31 is shown, there can be other motors controlled by base microprocessor 9 such as a motor for moving printhead 33 in a second direction and a motor for moving a mailpiece clamping mechanism (not shown).

Printhead module 5 includes printhead 33, a printhead driver 37, a drawing engine 39 (which can be a microprocessor or an Application Specific Integrated Circuit (ASIC)), a microprocessor 41 and a non-volatile memory 43. NVM 43 has stored therein indicia image data which can be printed on a mailpiece. Microprocessor 41 receives a print command, the postage amount, and date of submission via the base microprocessor 9. The postage amount and date of submission are sent from microprocessor 41 to the drawing engine 39 which then accesses non-volatile memory 43 to obtain the required indicia image data therefrom which is stored in registers 44 to 44n. The stored image is then downloaded on a column-by column basis by the drawing engine 39 to the printhead driver 37, via column buffers 45,47 in order to energize individual printhead elements 33a to print the indicia image on the mailpiece. The individual column-by-column generation of the indicia image is synchronized with movement of printhead 33 until the full indicia is produced. Specific details of the generation of the indicia image is set forth in copending application Ser. No. 08/554,179 filed Nov. 6, 1995, which has issued as U.S. Pat. No. 5,651,103 and is incorporated herein by reference.

Figure 2:
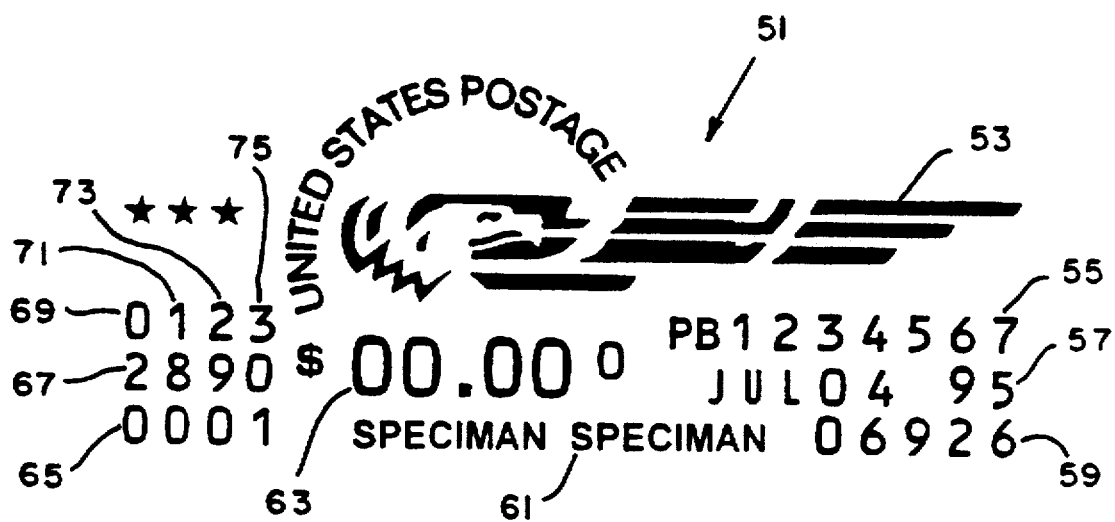
FIG. 2 shows an indicia produced by the inventive apparatus.

FIG. 2 shows an enlarged representative example of a typical postage indicia which can be printed by postage meter 1 for use in the United States. The postage indicia 51 includes a graphical image 53 including the 3 stars in the upper left hand corner, the verbiage "UNITED STATES POSTAGE", and the eagle image; an indicia identification number 55; a date of submission 57; the originating zip code 59; the words "mailed from zip code" 61, which for the ease of simplicity is just being shown with the words "SPECIMEN SPECIMEN"; the postage amount 63; a piece count 65; a check digits number 67; a vendor I.D. number 69; a vendor token 71; a postal token 73; and a multipass check digit 75. While most of the portions of the indicia image 51 are self explanatory, a few require a brief explanation. The vendor I.D. number identifies who the manufacturer of the meter is, and the vendor token and postal token numbers are encrypted numbers which can be used by the manufacturer and post office, respectively, to verify if a valid indicia has been produced.

The FIG. 2 indicia is simply a representative example and the information contained therein will vary from country to country. In the context of this application the terms indicia and indicia image are being used to include any specific requirements of any country.

A benefit of the above-described distributed postage meter system is that because of the divided functionality, less expensive microprocessors can be utilized resulting in a lower cost postage meter. Moreover, the modularity of the system allows for easy replacement of the vault and printing modules in the event of failure of either of these modules. However, as previously discussed, the use of a distributed digital system where data is transferred over physically unsecured data lines (for example, data lines 10, 6) results in the system being susceptible to having its data intercepted and reproduced. If such interception and reproduction is accomplished, it is possible that printing module 5 could be driven to print an indicia image without the necessary accounting taking place.

In order to overcome the security problem discussed above, a secure electronic link is provided between vault microprocessor 7 and print module microprocessor 41. The secure electronic link is accomplished through an encryption process which provides for a mutual authentication between the printhead module 5 and the vault microprocessor 7 prior to authorizing printing of the indicia image, debiting of postage, and updates to certain vault data such as PIN location and account numbers. The inventive encryption process significantly decreases the possibility of data interception and reproduction. Moreover, in the preferred embodiment base microprocessor 9 acts as a non-secure communication channel between the vault microprocessor 7 and print module microprocessor 41. However, the secure linked discussed above and described in more detail below can be applied between any subsystems of postage meter 1.

The inventive method is described in FIG. 3. In step S1 an operator enters a desired postage amount for a postage transaction via the keyboard 11. Upon insertion of the mailpiece into the postage meter 1 and its clamping in place by a platen (not shown), base microprocessor 9 sends a signal to vault microprocessor 7 and print module microprocessor 41 requesting that a session key (SK) be established as shown in step S2. In order to establish the session key, vault microprocessor 7 and printhead module microprocessor 41 each have an identical set of "M" authentication keys (AK) stored in memory, with each authentication key having a particular index (1 to M) associated therewith. In addition, print module microprocessor 41 also has a set of numbers "0 to N" stored therein which are used to select a particular one of the authentication keys. That is, print module microprocessor 41 is programmed for each postage transaction to select one of the set of numbers "0 to N" either on a sequential or random basis (step S3). Assuming for example that the number "N" is selected, print module microprocessor 41 determines the particular authentication key index AKI (step S4) utilizing a conventional translation function that creates an index within the range 1 to M. Since the authentication keys AK1 to AKM are stored in a look-up table in the vault microprocessor 7 and print module microprocessor 41, the index AKI can be associated with a particular key, such as for example, AK1 (step S5). It is important to note that the set of numbers 0 to N can be much larger than the number of keys 1 to M. Therefore, the combination of a large set of numbers 0 to N combined with the random selection of one of these numbers to create the index AKI results in a very secure process.

After print module microprocessor 41 selects one of the numbers 0 to N, that number is sent to vault microprocessor 7 together with a first piece of data VD1 that varies with each postage transaction and is stored in register counter 77 in print module microprocessor 41 (step S6). Upon receipt, the vault microprocessor 7, which has stored therein an identical authentication key look-up table and the AKI translation function used by the print module microprocessor 41, independently uses the selected number 0 to N to generate AKI and identify the same authentication key AK (step S7) being utilized by the print module microprocessor 41. The vault microprocessor 7 also has a register 79 whose contents VD2 are variable for each postage transaction and are used together with the authentication key AK to create the session key SK (step S8). That is, a conventional encryption algorithm is applied to VD2 and the authentication key to produce the session key:

SK=ENCRYPT(VD2, AK).

Once vault microprocessor 7 determines the session key, it generates a first authentication certificate (AUC1) (step S9) as follows:

AUC1=ENCRYPT(VD1, SK)

Subsequent to generation of the first authentication certificate, vault microprocessor 7 sends all or part of the first authentication certificate and VD2 to the print module microprocessor 41 (step S10). That is, if AUCI is, for example, eight bytes of data, it can be sent in total or a truncation algorithm can be applied to it to only send a predetermined number of bytes of AUC1. The print module microprocessor 41, upon receipt of AUC1, independently determines SK (step S11) in the same manner as vault microprocessor 7 since print module microprocessor 41 has stored therein the DES algorithm, has itself generated AK, and has received VD2 from vault microprocessor 7.

Subsequent to its generation of SK, print module microprocessor 41 generates a second authentication certificate:

AUC2=ENCRYPT(VD1, SK)

which should be the same as AUC1 (step S12). In the event that print module microprocessor compares AUC1 to AUC2 (step S13) and they are not the same, the print module microprocessor 41 will initiate cancellation of the postage transaction (step S14). On the other hand, if AUC1 and AUC2 are the same, print module microprocessor 41 has authenticated that vault microprocessor 7 is a valid vault. It is to be noted that if a truncated portion of AUC1 is sent from vault microprocessor 7 to print module microprocessor 41, then print module microprocessor 41 must apply the same truncation algorithm to AUC2 prior to the comparison step.

Subsequent to vault microprocessor 7 authentication, print module microprocessor 41 generates a first ciphered data certificate "CD1" where:

CD1=ENCRYPT(VD3, SK)

and VD3 represents a variable piece of data within the meter 1 such as piece count or date of submission, which data is made available to both the vault microprocessor 7 and print module microprocessor 41 (step S15). Upon generation of CD1, it is sent in whole or in part (as discussed in connection with AUC1, AUC2) to vault microprocessor 7 (step S16). Vault microprocessor 7 then generates its own ciphered certificate of data "CD2" by applying the encryption algorithm to VD3 and the session key SK generated by vault microprocessor 7 (step S17). Vault microprocessor 7 then compares CD1 to CD2 (step S18) and if they do not match, vault microprocessor 7 initiates cancellation of the postage transaction (step S19). In the event that CD1 and CD2 are the same, the vault microprocessor 7 has authenticated print module microprocessor 41 and mutual authentication between vault microprocessor 7 and print module microprocessor 41 has been completed. Subsequently, vault microprocessor 7 is prepared to debit the required postage amount in the accounting module. Upon completion of the debit, a print command is sent to the printhead module 5 to initiate printing of the indicia image (step S20).

The above process provides an extremely secure electronic link between subsystems because all data which is transmitted between the subsystems is variable for each postage transaction. While this does not necessarily have to be the case, it provides increased security by reducing the predictability of the data being transferred. The use of the variable data (VD1, VD2, VD3) ensures the uniqueness of the ciphered values (SK, AUC1, AUC2, CD1, CD2) for each postage transaction. Moreover, the session key, which is required to initiate the whole mutual authentication procedure and to generate AUC1, AUC2, CD1 and CD2, is never transmitted between the individual subsystems thereby guaranteeing the secure knowledge of the session key among the subsystems. Finally, if a truncation algorithm is used in connection with any or all of the generated certificates, security is further enhanced since the truncation algorithm must be known in order to complete the postage transaction.

What is claimed is:

1. A method for authenticating functional modules of a postage meter having a vault and a printer in communication with each other, the method comprising:

A) sending first and second variable data from the printer to the vault;

B) generating a first session key within the vault by applying an encryption algorithm to the first variable data received from the printer and third variable data resident within the vault;

C) generating a first authentication certificate in the vault by applying the encryption algorithm to the second variable data received from the printer and to the first session key;

D) sending the first authentication certificate and the third variable data from the vault to the printer;

E) generating a second session key within the printer by applying the encryption algorithm to the third variable data received from the vault and the first variable data;

F) generating a second authentication certificate in the printer by applying the encryption algorithm to the second variable data and the second session key; and G) the printer comparing the first authentication certificate received from the vault to the second authentication certificate and if the first and second authentication certificates are the same the printer verifies that the vault is authenticated.

2. A method as recited in claim 1, further comprising the printer generating a first ciphered certificate by applying the encryption algorithm to fourth variable data and to the second session key; the printer sending the first ciphered certificate to the vault; the vault generating a second ciphered certificate by applying the encryption algorithm to the fourth variable and to the first session key; and the vault comparing the first ciphered certificate to the second ciphered certificate such that if the first and second ciphered certificates are the same the vault verifies that the printer is authentic; and at times when both the vault and printer have been verified by each other as being authentic printing of an indicium by the postage meter is authorized.

* * * * *